(12) United States Patent
Jones et al.

(10) Patent No.: US 8,213,691 B2
(45) Date of Patent: Jul. 3, 2012

(54) METHOD FOR IDENTIFYING FACES IN IMAGES WITH IMPROVED ACCURACY USING COMPRESSED FEATURE VECTORS

(75) Inventors: Michael Jeffrey Jones, Belmont, MA (US); Jay Thornton, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 751 days.

(21) Appl. No.: 12/345,919

(22) Filed: Dec. 30, 2008

(65) Prior Publication Data

US 2010/0166266 A1 Jul. 1, 2010

(51) Int. Cl.
*G06K 9/00* (2006.01)

(52) U.S. Cl. ........ 382/118; 345/621; 348/169; 382/190; 382/195

(58) Field of Classification Search .................. None
See application file for complete search history.

(56) References Cited

U.S. PATENT DOCUMENTS

| | | | |
|---|---|---|---|
| 7,031,499 B2 * | 4/2006 | Viola et al. | 382/118 |
| 7,391,889 B2 | 6/2008 | Kim et al. | |
| 2004/0190760 A1 * | 9/2004 | Liu | 382/118 |
| 2005/0105780 A1 | 5/2005 | Ioffe | |
| 2005/0201595 A1 * | 9/2005 | Kamei | 382/118 |
| 2006/0034517 A1 | 2/2006 | Bober | |
| 2006/0104484 A1 | 5/2006 | Bolle | |
| 2006/0177110 A1 * | 8/2006 | Imagawa et al. | 382/118 |
| 2007/0265848 A1 | 11/2007 | Chaudhari | |

FOREIGN PATENT DOCUMENTS

| | | |
|---|---|---|
| EP | 1522962 A1 | 7/2003 |
| WO | 2008/080414 A1 | 7/2008 |

OTHER PUBLICATIONS

Wladslaw Skarbek et al., "Cascade of Operators for Facial Image Recognition and Indexing;" Institute of Radioelectronics; Warsaw University of Technology, Poland pp. 1-12.

* cited by examiner

*Primary Examiner* — John Lee
(74) *Attorney, Agent, or Firm* — Dirk Brinkman; Gene V. Vinokur

(57) ABSTRACT

A method identifies an unknown face in an input image using reference images of known faces. A Haar-like feature vector is extracted from each image. The vectors are compressed. An L1 norm is determined between the compressed feature vector of the input image and each compressed feature vector from the set of reference images to determine a most similar reference image. The identity of the face associated with the most similar reference image is assigned as the identity of the unknown face in the input image.

11 Claims, 3 Drawing Sheets

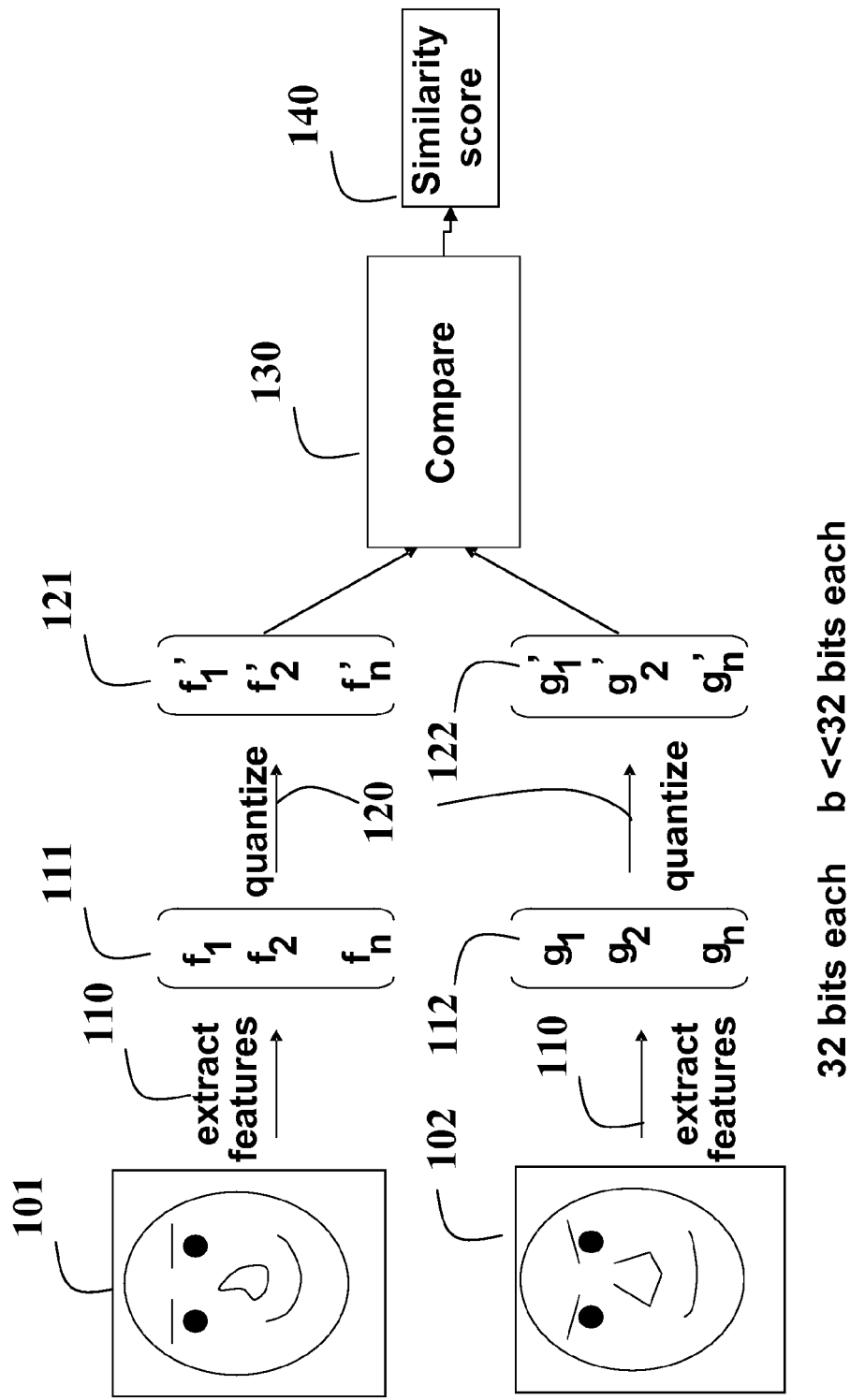

METHOD FOR IDENTIFYING FACES IN IMAGES WITH IMPROVED ACCURACY USING COMPRESSED FEATURE VECTORS

FIELD OF THE INVENTION

The present invention relates generally to pattern and object recognition, and more particularly to identifying human faces in still and moving images using compressed feature vectors.

BACKGROUND OF THE INVENTION

Images of faces are frequently used for identifying people. As used herein, and not to be confused, detection pertains to what is in an image, i.e., are there any faces in the image or not? Identification pertains to who is in the image, i.e., determining the identity of a face in an image.

In face identification, the unknown face can be represented by a vector of features. To compare two face images, the feature vectors are used to compute a similarity score. The higher the similarity score the more similar the faces. In one example face identification application, the feature values are floating point numbers stored in 32 bits. A feature vector for a single face has on the order of 1000 features, i.e., 32,000 bits. Obviously, such large feature vectors consume memory and require a considerable amount of resources to process. This is particularly true where the underlying database of known reference images can contain millions of images.

An obvious solution is to compress the feature vectors. However, it is well known that compressing data discards data, and operations on compressed data decrease the accuracy of the results.

Face Identification

One of the most visually distinguishing features of a person is the face. Therefore, face detection and identification in still and moving images (videos) is an important technology for many applications where it is desired to identify a person from images. Face identification presents an extremely difficult challenge for computer vision technology.

For example, in facial images acquired by surveillance cameras, the lighting of a scene is often poor and uncontrolled, and the cameras are generally of low quality and usually distant from potentially important parts of the scene. The location and orientation of the faces in the scene usually cannot be controlled. Some facial features, such as the hairline, eyebrows, and chin are easily altered. Other features, such as the mouth are highly variable, particularly in a video.

The core of a face identification system is a similarity function that takes as input two images and outputs a similarity score. The face similarity function can be used to compare an image of an unknown face (an input image) with a set of images of known faces (reference images). The set of reference images can include multiple images of the same face. Each image has an associated identification. The unknown input face is identified as the identity of the reference image with largest similarity score when compared to the input face as long as the largest similarity score is above a threshold. Otherwise the input face remains unknown.

There are many methods for computing a similarity score between two faces. Almost all methods involve first computing a feature vector for each of the two faces and then comparing the feature vectors. Well known methods use principal component analysis (Eigenfaces), linear discriminant analysis (Fisherfaces), and elastic bunch graphs.

As a problem, the size of the features can be very large, requiring a large amount of computer memory to store.

SUMMARY OF THE INVENTION

A method compares two face images to yield a similarity score. Feature vectors are extracted from each image. The feature vectors are compressed, and the compressed feature vectors are compared to yield a similarity score.

BRIEF DESCRIPTION OF THE DRAWINGS

FIG. 1 is a block diagram of a face recognition method according to embodiments of the invention.

DETAILED DESCRIPTION OF THE PREFERRED EMBODIMENT

Figure 2A:
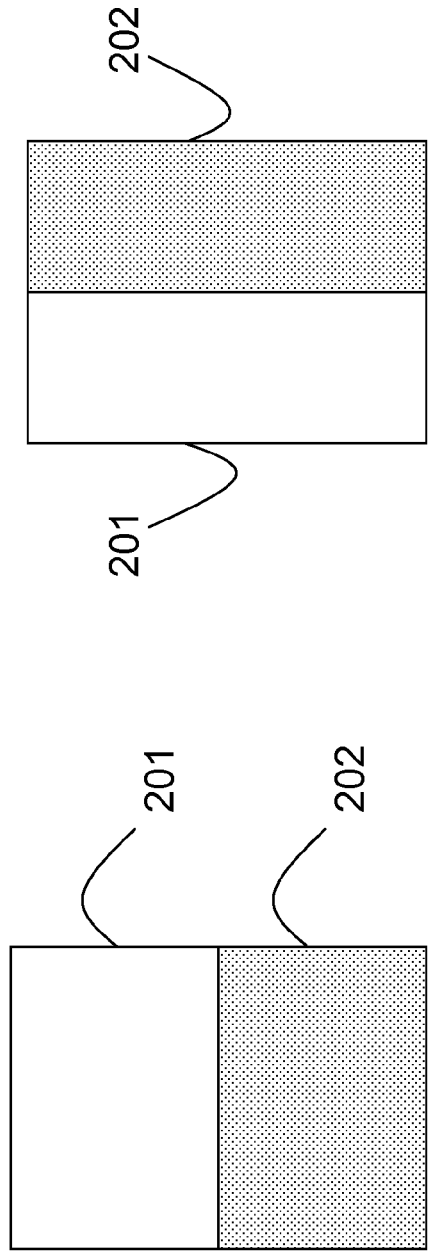
FIGS. 2A-2D are examples of filters used by some embodiments to extract Haar-like features.
Figure 2B:
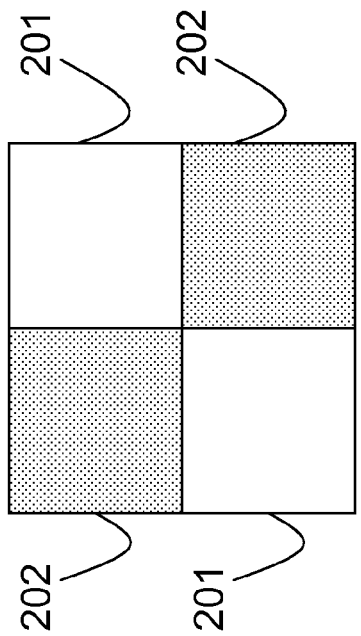
Figure 2C:
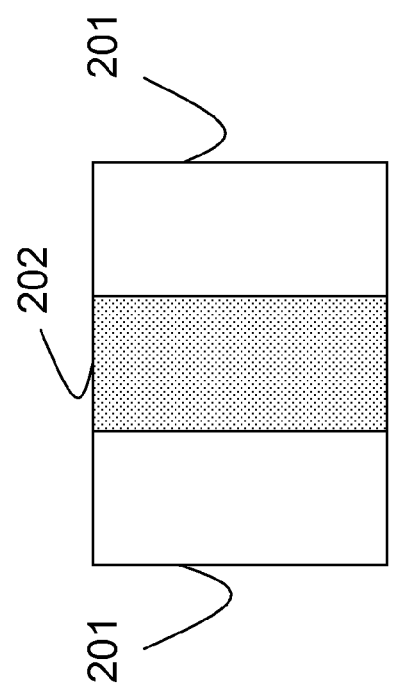
Figure 2D:
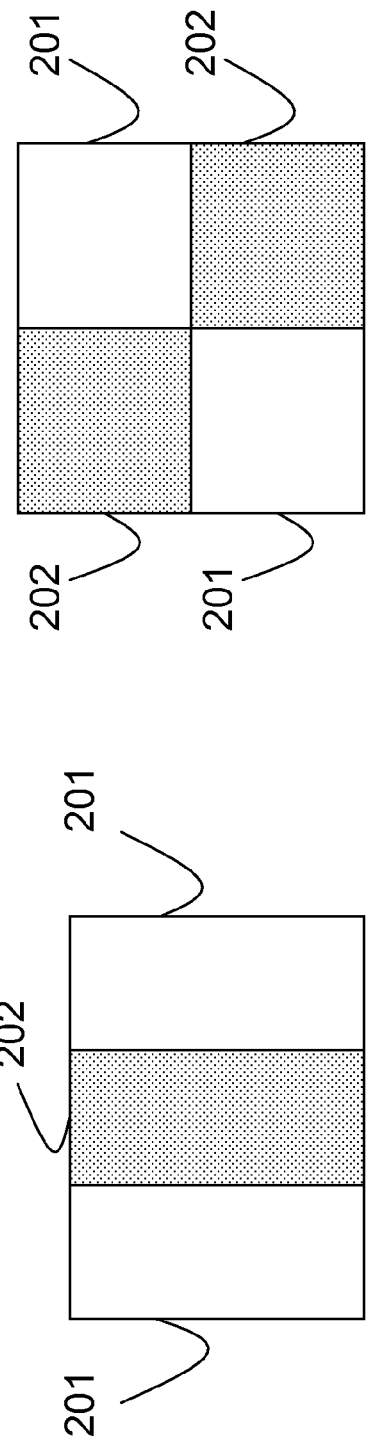

FIG. 1 shows a method according to an embodiment of our invention for comparing two face images. A feature vector 111 is extracted 110 from an image 101 acquired of an unknown face. A different feature vector 112 is also extracted from an image 102 of another faces. The feature vectors 111-112 are quantized to compressed feature vectors 121-122, respectively. The compressed feature vectors are compared 130 to determine a similarity score 140. The similarity score indicates if the faces in the two images 101-102 the same or not.

Pre-Processing: Face Detection

The invention is not concerned with how the images of the faces are acquired. Conventional face detection can be used. As used herein, and not to be confused, detection pertains to what is in an image, i.e., are there any faces in the image or not? Identification pertains to who is in the image, i.e., what is the identity of a face in the image?

Pre-Processing: Normalization

As an option, the faces in pairs of images to be compared can be normalized with respect to size, orientation, and illumination. For example, the faces can almost fill the image, and can be vertically and horizontally aligned.

Feature Extraction

During feature extraction, multiple filters are applied to rectangular patches of pixels in the input and reference images. The filters can be template filters that are the same size and location as the patches. For example, as shown in FIGS. 2A-2D, Haar-like features can be extracted. A simple rectangular Haar-like feature is defined as a weighted sum or difference of sums of pixel values within two or more rectangular patches 201-202 in the image. The rectangular patches are contiguous and can be at any position and scale within the image. The Haar-like features can indicate the existence (or not) of certain characteristics in the image, such as edges or changes in texture, or whether the patch lies on the border between a dark region and a light region. The hundreds or thousands of features used to form the feature vector are typically learned in a training stage from a much larger set of hundreds of thousands of possible features.

Haar-like features can be quickly computed using integral images. An integral images is be defined as a two-dimensional lookup table in the form of a matrix with the same size of the image. Each element of the integral image contains the sum of all pixels located on the upper-left region of the original image, in relation to the element's position. This allows computation of the sum of rectangular patches in the image, at any position or scale, using a very small number of lookups, e.g., four, i.e., sum=$pt_4$−$pt_3$−$pt_2$+$pt_1$, where element points $pt_n$ are elements of the integral image that form the corners of a rectangle in the Haar-like feature.

Figure 3:
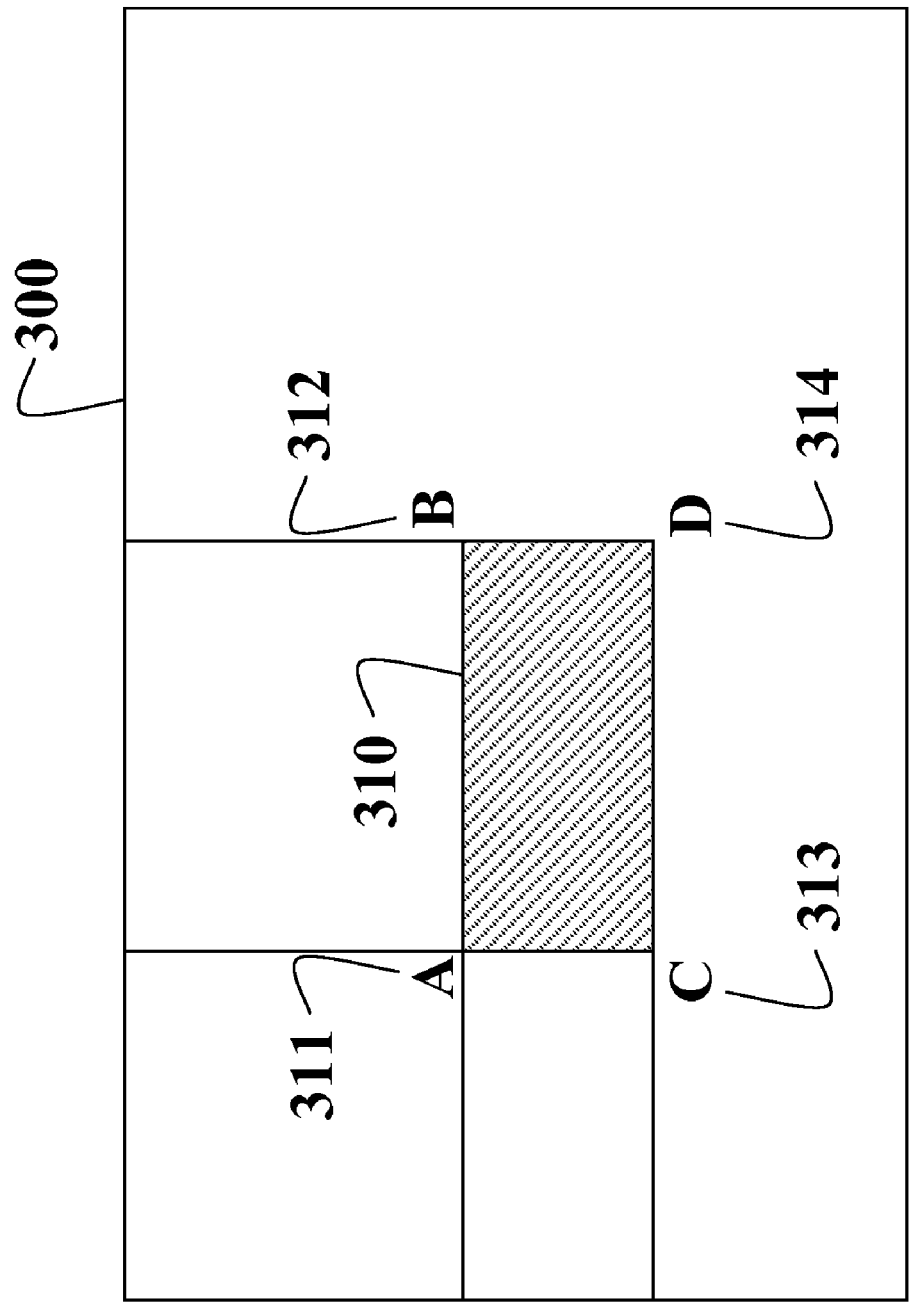
FIG. 3 is an illustration of determining a sum of pixel intensities in a rectangular area according to one embodiment of the invention.

As shown in FIG. 3, the sum of pixel intensities in a rectangular area 310 of the integral image 200 with integral image values at corners A, B, C and D 311-314 of the rectangle ABCD 310 can be determined as $$\text{Area}(ABCD) = A + D - B - C.$$

Feature Compression

A feature in the real-valued feature vector is compressed to b bits by mapping all possible values of the feature onto the whole numbers from 0 to $2^b-1$. This is done by first computing the mean ($\mu$) and standard deviation ($\sigma$) of each feature over a large set of faces (for example, in a training phase). Then the values of the feature that fall within (for instance) one standard deviation of the mean are mapped onto the real numbers from 0 to $2^b-1$ using a simple linear mapping. Any feature value that is less than mean minus one standard deviation is mapped to 0. Any feature value that is greater than mean plus one standard deviation is mapped to $2^b-1$. The mapped feature value is then truncated (quantized) to yield a whole number. It should be noted that the standard deviation can generalized to s$\sigma$, where the variable s is a real number, e.g., 1.0, 1.1, 2.0, 3.0, 3.5, etc. The scalar s controls a width of a truncation region about the mean $\mu$.

This method of feature compression can be expressed in equations as $$T_i = 2^{b-1} \times \left(1 + \left(\frac{f_i - \mu_i}{s\sigma_i}\right)\right),$$

$$C_i = \begin{cases} 2^b - 1 & \text{for } T_i > 2^b - 1 \\ T_i & \text{for } 0 \leq T_i \leq 2^b - 1, \\ 0 & \text{for } T_i < 0 \end{cases}$$

$$F_i = \text{truncate}(C_i).$$

where $f_i$ is the value of the input feature, $\mu_i$ is the mean of the feature, $s\sigma_i$ is the scaled standard deviation(s) of the feature, b is the desired number of bits in the compressed feature, $F_i$ is the final compressed feature value, which can have whole numbered values from 0 to $2^b-1$.

Surprisingly, and in contrast with what would be expected, our method works well with very few feature bits. Normally, one would expect that decreasing the number of bits used to represent a feature value would also decrease the accuracy. However, for the manner that we compress this is not the case. We can obtain accurate results with values in a range 0-255, i.e., b=8. Thus, our compression factor is fourfold. Even more surprisingly, and against all expectations and common sense, we discovered that our method also worked with just one bit (b=1), and that going from 8 bits to 1 bit did not substantially decrease the accuracy of our results.

Mean and Standard Deviation

The mean ($\mu$) and standard deviation(s) ($\sigma$) for each feature can be computed from a training set of images. A total number of training images is r, and n is a total number of features in each feature vector. A feature vector extracted from the $x^{th}$ training image is $v_x = [f_1, f_2, \ldots, f_n]$ where $1 \leq x \leq r$. An $i^{th}$ feature value of $v_x$ is $f_i$ where $1 \leq i \leq n$. A vector of means $\mu = [\mu_1, \mu_2, \ldots, \mu_n]$ is determined according to $$\mu_i = \frac{\sum_{x=1}^{r} (f_i)_x}{r}, \quad 1 \leq i \leq n,$$

and a vector of the standard deviations $\sigma = [\sigma_1, \sigma_2, \ldots, \sigma_n]$ is determined according to $$\sigma_i = \sqrt{\frac{\sum_{x=1}^{r} ((f_i)_x - \mu_i)^2}{r}}, \quad 1 \leq i \leq n.$$

Feature Comparison

There are various ways to compute a distance (similarity) between two compressed feature vectors, f and g. A simple method determines the L1 norm between the two feature vectors. This can be expressed mathematically as $$d = \sum_{i=1}^{n} |F_i - G_i|,$$

where $F_i$ is the $i^{th}$ feature of feature vector of F, and $G_i$ is the $i^{th}$ feature of feature vector G, and d is the resulting L1 distance between feature vectors F and G.

The similarity score S can then be computed as $$S = M - d,$$

where M is the maximum possible score of the L1 norm between two feature vectors. For the two compressed feature vectors with b bits, the maximum score of the L1 norm is $(2^b-1)*n$.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for comparing an input image of an unknown face with a reference image of a known face, comprising the steps of:

extracting a feature vector from each image;

compressing the feature vectors into compressed feature vectors; and comparing the compressed feature vectors to determine a similarity score for the two faces, in which n is a number of features in each feature vector, $v = [f_1, f_2, \ldots, f_n]$ is the feature vector extracted from each image, $f_i$ is an $i^{th}$ feature of the feature vector $v_x$ where $1 \leq i \leq n$, $\mu = [\mu_1, \mu_2, \ldots, \mu_n]$ is a vector of means of the features, $\sigma = [\sigma_1, \sigma_2, \ldots, \sigma_n]$ is a vector of standard deviations of the features, s is a scalar constant controlling a width of a truncation region about $\mu$, and the compressing further comprises:

determining a value $F_i$ for each extracted feature value $f_i$ according to $$T_i = 2^{b-1} \times \left(1 + \left(\frac{f_i - \mu_i}{s\sigma_i}\right)\right),$$

$$C_i = \begin{cases} 2^b - 1 & \text{for } T_i > 2^b - 1 \\ T_i & \text{for } 0 \le T_i \le 2^b - 1, \\ 0 & \text{for } T_i < 0 \end{cases}$$

$$F_i = \text{truncate}(C_i).$$

where b is a number of bits used to store the value $F_i$.

2. The method of claim 1, in which the features are rectangular Haar-like features defined as a weighted sum or difference of sums of pixel values within two or more rectangular patches of pixels in the images, and wherein the rectangular patches are contiguous at any position and scale within the images.

3. The method of claim 2, wherein the Haar-like features are determined from integral images.

4. The method of claim 1, wherein the feature vector is extracted and compressed from each of a set of reference images of a set of corresponding known faces, and the compressed feature vector of the input image is compared with each feature vector of the set of reference images to determine a similarity score for the unknown face with each known face.

5. The method of claim 1, wherein the mean and standard deviation is determined from a set of training images, wherein a total number of training images is r, and n is a total number of features in each feature vector, and wherein a feature vector extracted from an $x^{th}$ training image is $v_x = [f_1, f_2, \ldots, f_n]$ where $1 \le x \le r$, and an $i^{th}$ feature value of $v_x$ is $f_i$ where $1 \le i \le n$, and a vector of means $\mu = [\mu_1, \mu_2, \ldots, \mu_n]$ is determined according to $$\mu_i = \frac{\sum_{x=1}^{r} (f_i)_x}{r}, 1 \le i \le n,$$

and a vector of standard deviations $\sigma = [\sigma_1, \sigma_2, \ldots, \sigma_n]$ is determined according to $$\sigma_i = \sqrt{\frac{\sum_{x=1}^{r} ((f_i)_x - \mu_i)^2}{r}}, 1 \le i \le n.$$

6. The method of claim 1, in which $F = [F_1, F_2, \ldots, F_n]$ is the compressed feature vectors of the input image, $G = [G_1, G_2, \ldots, G_n]$ is the compressed feature vectors of the reference image, M is a maximum value of a L1 norm of the compressed feature vectors F and G, and the similarity score is determined according to $$\text{Similarity}(F, G) = M - \sum_{i=1}^{n} |F_i - G_i|.$$

7. The method of claim 1, further comprising:
normalizing the feature vectors to produce normalized feature vectors; and
quantizing the normalized feature vectors to produce quantized feature vectors, and wherein the comparing uses the quantized feature vectors.

8. The method of claim 4, wherein each reference image has an associated identity, and the associated identity of the reference image with a largest similarity scored when compared to the input face as long as the largest similarity score is above a predetermined threshold.

9. The method of claim 1, wherein b is eight.

10. The method of claim 1, wherein b is one.

11. The method of claim 1, wherein the standard deviation is in a form of sσ, wherein s is a real number.

* * * * *